Figure 1:
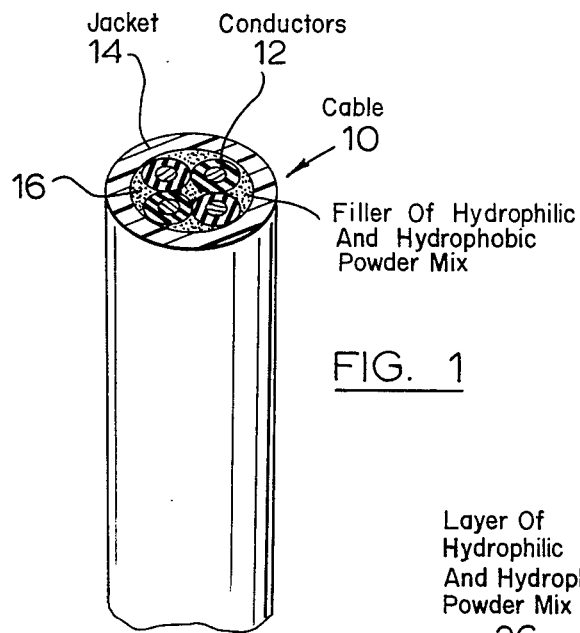

United States Patent [19]

Woytiuk

[11] 4,004,077
[45] Jan. 18, 1977

[54] WATER BLOCKED ELECTRIC CABLES

[75] Inventor: Leo Victor Woytiuk, Pointe-Claire, Quebec, Canada

[73] Assignee: Northern Electric Company Limited, Montreal, Canada

[22] Filed: Mar. 7, 1975

[21] Appl. No.: 556,294

[52] U.S. Cl. .............................. 174/23 C; 174/116
[51] Int. Cl.² ......................................... H01B 7/28
[58] Field of Search ............. 174/23 C, 23 R, 25 R, 174/25 C, 25 P, 116, 102 P

[56] References Cited

UNITED STATES PATENTS

| | | | |
|---|---|---|---|
| 3,538,235 | 11/1970 | Arendt et al. | 174/23 C |
| 3,711,621 | 1/1973 | Jachimowicz | 174/23 R |
| 3,733,225 | 5/1973 | Moody | 174/23 C X |
| 3,803,339 | 4/1974 | Speekman | 174/23 C |

FOREIGN PATENTS OR APPLICATIONS

| | | | |
|---|---|---|---|
| 2,007,163 | 9/1971 | Germany | 174/23 R |
| 1,765,466 | 10/1972 | Germany | 174/23 C |

Primary Examiner—Arthur T. Grimley

[57] ABSTRACT

An electric cable having a multi-stranded core and a jacket, in which the voids between and around the core are at least partially filled with a mixture of a hydrophobic powder and a hydrophilic powder. The hydrophobic powder may be coated calcium carbonate and a hydrophilic powder may be polyacrylamide, in which case the polyacrylamide should be between 8% and 30% by weight of the mixture. Preferably the individual conductors are coated with a hydrophobic oil such as a low viscosity paraffinic oil.

2 Claims, 2 Drawing Figures

WATER BLOCKED ELECTRIC CABLES

This invention relates to electric cables protected against the entry and migration of water.

Cables for use underground where water is present in the environment are now manufactured by filling the interstices between and around the conductors with a jelly or greaselike material to protect the polyolefin insulated conductors against contact with water entering the cable and to prevent any water which does come into contact with a conductor from excessively migrating along the conductor. For effective water blockage such a cable must be filled almost 100% which requires a large amount of filler material. Also, the jelly or greaselike material is difficult to remove from the conductors during splicing and terminating the cable. It is often necessary to apply the filling compound hot and this tends to degrade the insulation on each conductor. The jelly or greaselike material also sometimes imparts stiffness to the cable which hampers installation, especially at low temperatures. A further disadvantage is that such materials are flammable.

The present invention overcomes these disadvantages by providing an electric cable with a powder filling.

In its broadest aspect the invention consists of an electric cable having a core of a plurality of conductors and a jacket, the interstices between the conductors and within the jacket being at least partially filled with a mixture of a hydrophobic powder and a hydrophilic powder.

Figure 2:
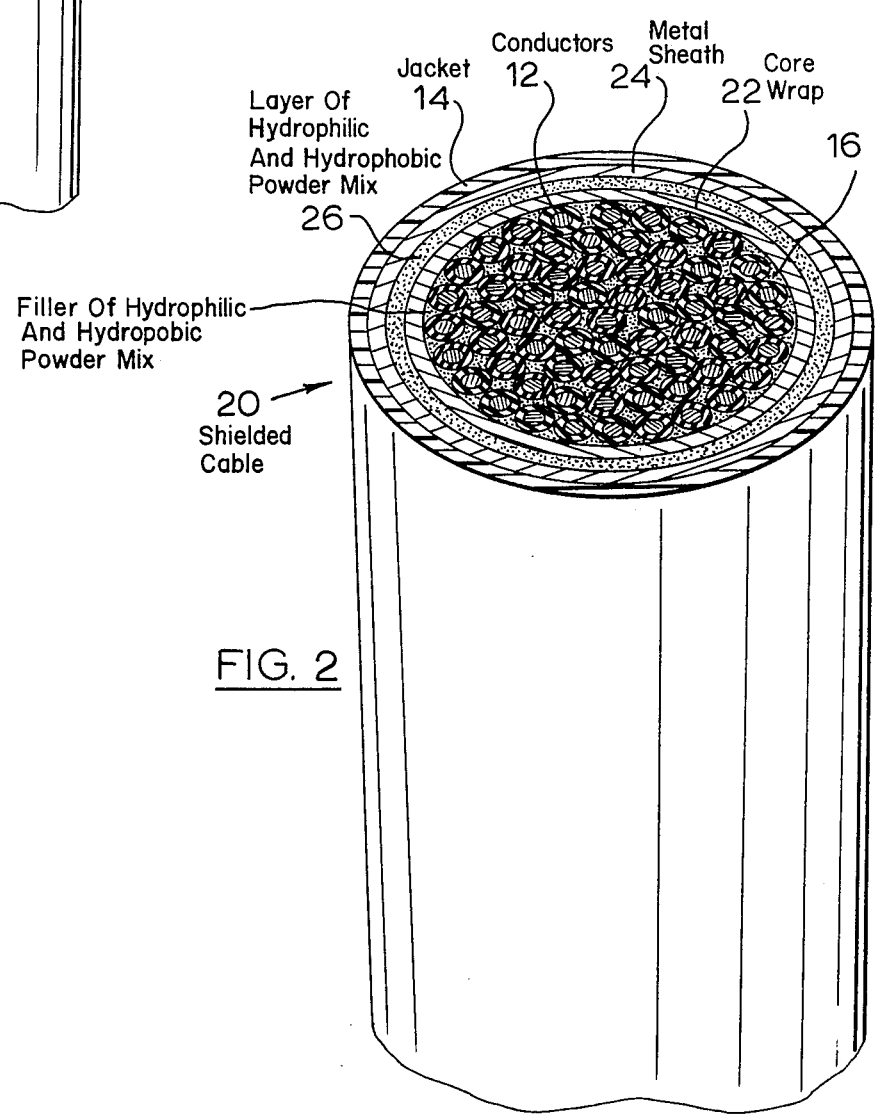

Example embodiments of the invention are shown in the accompanying drawings in which:

FIG. 1 shows a multi-stranded, jacketed electric cable filled according to the invention; and FIG. 2 shows a multi-stranded, sheathed and jacketed electric cable filled according to the invention.

The example embodiment of FIG. 1 shows a cable 10 comprising a plurality of insulated conductors 12 stranded together to form a core enclosed in a jacket 14 of polyethylene or other material. The interstices between conductors 12 and jacket 14, and between the conductors themselves, contain a filler 16 consisting of a mixture of a hydrophobic powder and a hydrophilic powder. Preferably the hydrophobic powder is a long chain fatty acid coated calcium carbonate such as that sold under the trade mark "Protaxulate" or "Protex E" by Pluess-Stauffer A.G. of France, and hydrophilic powder is a high molecular weight polycrylamide such as that sold under the trade mark "Separan" by Dow Chemical Corporation or "Magnifloc" by the Cynamid Company. It should be noted that the manufacturers of such hydrophilic powders specify compacting to achieve water blockage but it will be appreciated that tamping of the core filler in the production of a continuous cable would be very difficult to achieve.

The percentage composition of filler 16 should be between 92% and 70% by weight of the hydrophobic powder and between 8% and 30% by weight of the hydrophilic powder, depending upon the electrical characteristics required of cable 10. The more critical the electrical transmission requirements, the lower will be the percentage by weight of the hydrophilic powder. For instance a telephone cable would require a minimum amount of the hydrophilic powder, i.e. 8%.

Using filler 16 of the invention it is not necessary to substantially fill the voids in cable 10. It has been found that in certain instances cable 10 will be water blocked when filled only 33% by volume, because of the nature of the reaction of filler 16 to the ingress of water into the core of the cable. When such ingress occurs the water forms a gell with the hydrophilic powder which is then repelled by the hydrophobic powder, thus restricting the area wetted. Any consequent pressure exerted on the gell serves to compact filler 16 and further enhances the resistance to water flow in cable 10.

To aid in the production of the filled cable core, and to inhibit the powders of filler 16 from falling out when cable 10 is cut, it is advantageous to wet the surfaces of the insulation of conductors 12 with a hydrophobic oil which will not produce adverse characteristics to the cable such as stress cracking in a polyethylene jacket. A high analine point, low viscosity paraffinic oil would be suitable for the purpose.

In the embodiment shown in FIG. 2 of the drawings a shielded cable 20 is formed by applying a core wrap 22 and then a metal sheath 24 between conductors 12 and jacket 14. Before applying core wrap 22, filler 16 is introduced to fill the voids between conductors 12 as before. After core wrap 22 has been applied a further amount of the same mixture of hydrophobic powder and hydrophilic powder is applied with metal sheath 24 to form a layer 26 interposed between the core wrap and the sheath.

I claim:

1. An electric cable having a core of a plurality of conductors and a jacket, the interstices between the conductors and within the jacket being at least partially filled with a mixture of a hydrophobic and a hydrophilic powder, the hydrophilic powder forming on contact with water a viscous, non-swelling material, the conductors being each coated with a hydrophobic oil.

2. A cable as claimed in claim 1 in which the hydrophobic oil is a low viscosity paraffinic oil.

* * * * *